AUTOMATIC DATA CONVERSION SYSTEM

Filed Jan. 24, 1957 3 Sheets-Sheet 1

INVENTORS,
JEROME CORWIN
MORTON F. ROSEMAN
ALCIDE SANTILLI
HAROLD STEIN
BY Harry M. Saragovitz
ATTORNEY INVENTORS
JEROME CORWIN
MORTON F. ROSEMAN
ALCIDE SANTILLI
HAROLD STEIN
BY Harry M. Saragovitz
ATTORNEY Oct. 6, 1959 J. CORWIN ET AL 2,907,997

AUTOMATIC DATA CONVERSION SYSTEM

Filed Jan. 24, 1957 3 Sheets-Sheet 3

INVENTORS
JEROME CORWIN
MORTON F. ROSEMAN
ALCIDE SANTILLI
HAROLD STEIN

BY Harry M. Saragovitz
ATTORNEY 2,907,997

AUTOMATIC DATA CONVERSION SYSTEM

Jerome Corwin, Bala Cynwyd, Pa., Morton F. Roseman, Long Branch, N.J., Alcide Santilli, Providence, R.I., and Harold Stein, Woburn, Mass., assignors to the United States of America as represented by the Secretary of the Army Application January 24, 1957, Serial No. 636,216

13 Claims. (Cl. 340—347)

Figure 1:
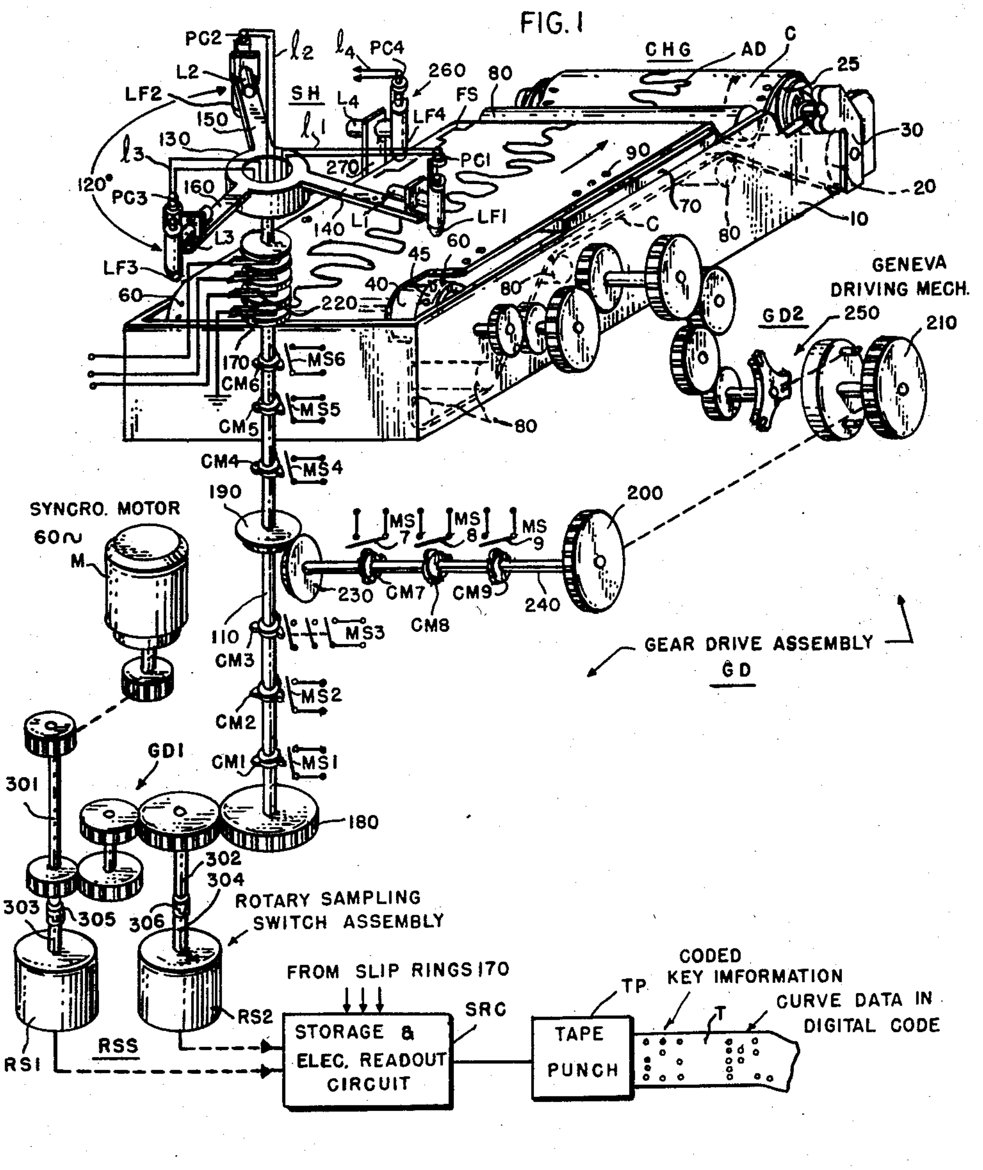

(Granted under Title 35, U.S. Code (1952), sec. 266)

The invention described herein may be manufactured and used by or for the Government for governmental purposes, without the payment of any royalty thereon.

The invention relates to automatic data processing and particularly to a system for converting data recorded in curvilinear form on a chart into another type of record of such data adapted for easy analyzation by mechanical means.

A general object of the invention is to produce such data conversion accurately with simple and economical equipment.

Another general object is to reduce analog information, such as measurements of physical quantities plotted graphically, to binary digital form.

A more specific object is to translate data recorded in curvilinear form on a chart into corresponding coded closures of electrical switching arrays suitable for controlling the operation of code printing equipment, for example, a teletype code tape punching mechanism, to produce a record of the data in the desired digital code form.

A related object is to translate analog data recorded in curvilinear form on a chart into another form of record of such data, consisting of a plurality of transverse rows of perforations in a tape in which the number and position of the perforations in each row represent in code form the data in a different section of the original curve record.

Another object is to record automatically on a tape in digital form information on the values of the ordinates in different sections of an analog data curve together with key information required for proper analyzation of this recorded data on the tape by mechanical means.

The automatic data processing or conversion system in accordance with the invention to be referred to hereinafter as an "automatic curve reader," serves to automatically and intermittently "read"; i.e., extract the values of ordinates, in different successive sections of a curve of data recorded on coordinate record-chart paper, and to translate these ordinate values into corresponding coded closures of electrical switching arrays. This automatic curve reader employs photoelectric means for recognizing discontinuities in the reflectance of light from the chart surface caused by the ink used in making the record, at points on the recorded curve. For this purpose, a special light image of a point on the curve in each region of the chart being read, is created by exposing the chart surface in this region to a source of illumination through conventional optical means. The illuminated image of each such point on the curve picked up by one of the three angularly-disposed reading arms of a "sensing head," rotated along a curved path transverse to the "time" axis of the chart, when that arm crosses over the curve, is transferred by reflection through a conventional optical train to an individual photoelectric cell mounted on that arm.

The intelligence of the chart is preserved by means of two essential supplemental features. First, the movement of the chart along its time axis is made intermittent, the chart being kept stationary while the optical "sensing" progresses along a curved path, and being permitted to advance only between sensing cycles.

Second, the position of the sensing arm at the time it encounters the optical discontinuity of an ordinate of the curve then establishes through suitable proportional switching arrangements the proper numerical channels for transmitting the current pulse generated by the photoelectric cell in that arm in response to the reflected light-image. The information on the values of ordinates in different sections of the curve, represented by the photoelectric pulse transmitted during each of successive "reading" periods, that is, when the chart is stationary and one of the sensing arms traverses the chart, is transmitted to and stored in suitable storage vacuum tubes. During the intermediate "non-reading" periods, when the chart advances along the time axis and each sensing arm is rotated to a point away from the chart, the stored information passes from these tubes to a relay matrix in an output printer which will cause its operation to decode the data from the Arabic form to a desired digital code form, such as "teletype" code, for example, on the relay contacts which are so coded. This printer may be a tape reperforator adapted to operate under control of the received pulses to select the proper coded combinations of solenoids to punch perforations in a plurality of transverse rows on a paper tape, the number and relative positions of the perforations in each row representing in code the data in a different section of the original curve record.

Tapes so prepared may be stored for future use, and when the informtaion thereon is desired, they may be fed into a commercial machine adapted to translate the coded information on the tape into perforations, figures or characters on cards to present the initial data in an orderly and readable manner.

A feature of the automatic curve reader of the invention is the use of auxiliary means, including cams and associated microswitches controlled thereby, on the shaft of the rotatable sensing head, or on an associated shaft, responsive at predetermined times during each "reading" period to control relay means in the tape perforator causing that mechanism to punch in separate transverse rows on the tape perforations in coded form which will provide certain key information for properly controlling the commercial machine later used for analyzing other coded information on the tape. For example, these perforations may be such that when the tape is fed into the latter machine they will cause a new card to be inserted therein in position for a punching or printing operation, or will cause the machine to print or punch numbers rather than characters on the cards, etc.

Another feature of the automatic curve reader of the invention is a device including a fourth "stationary" reading arm, similar to the three movable reading arms of the rotary sensing head, which is mounted so that it follows a folded (rectangular) scale in the margin of the chart paper, for indicating to the tape punching mechanism whether the values of the ordinates of the recorded curve sensed by the movable reading arms are positive or negative with respect to the time axis of the curve, so that its operation is controlled accordingly.

Figure 4:
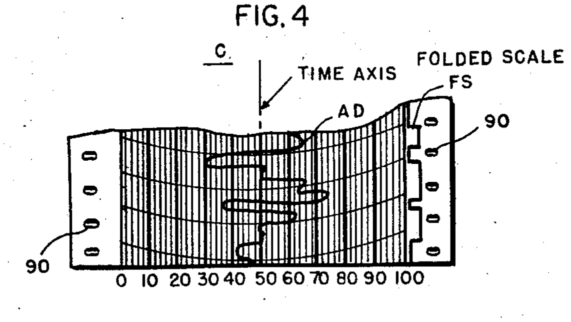
Figure 2:
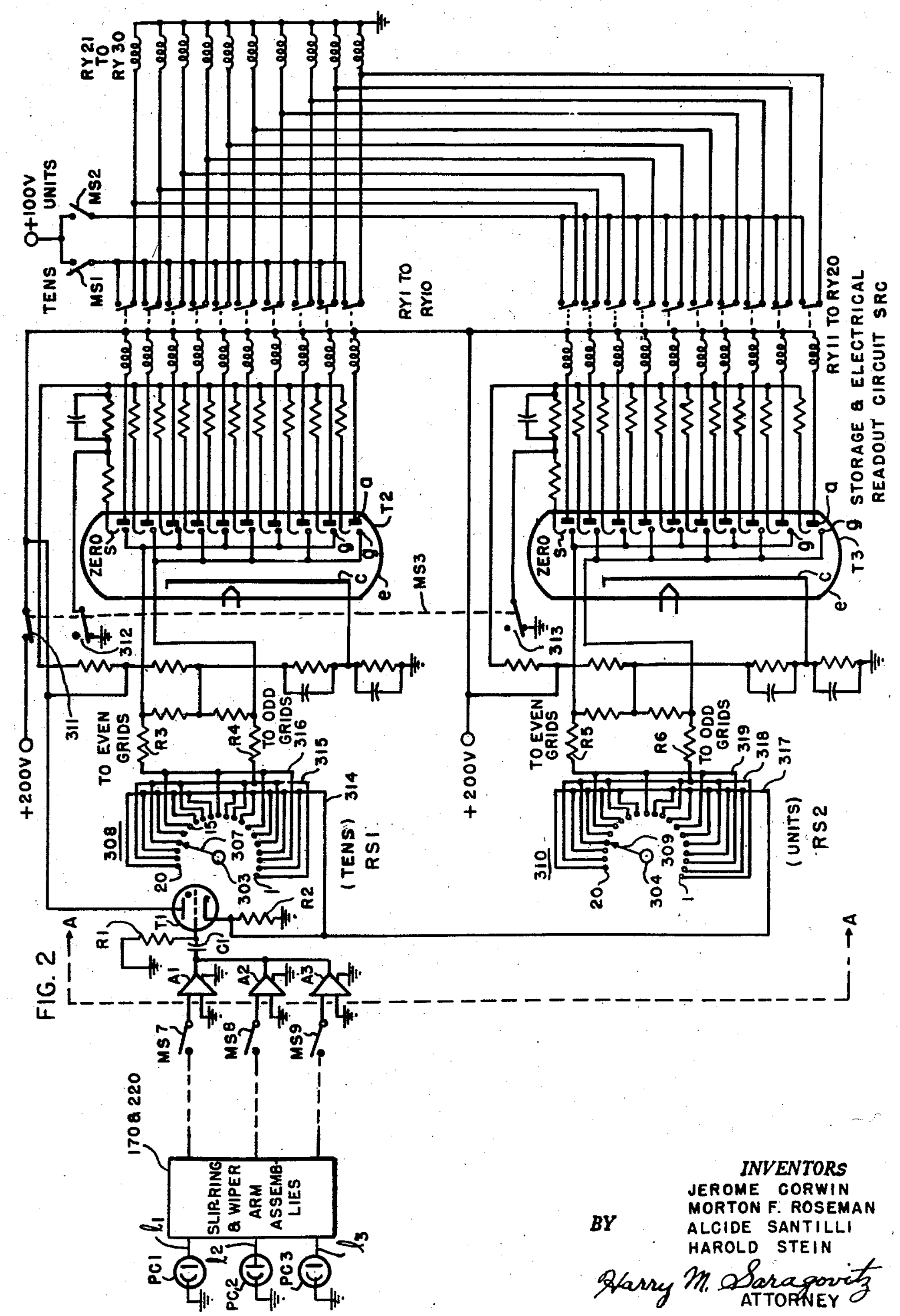
Figure 3:
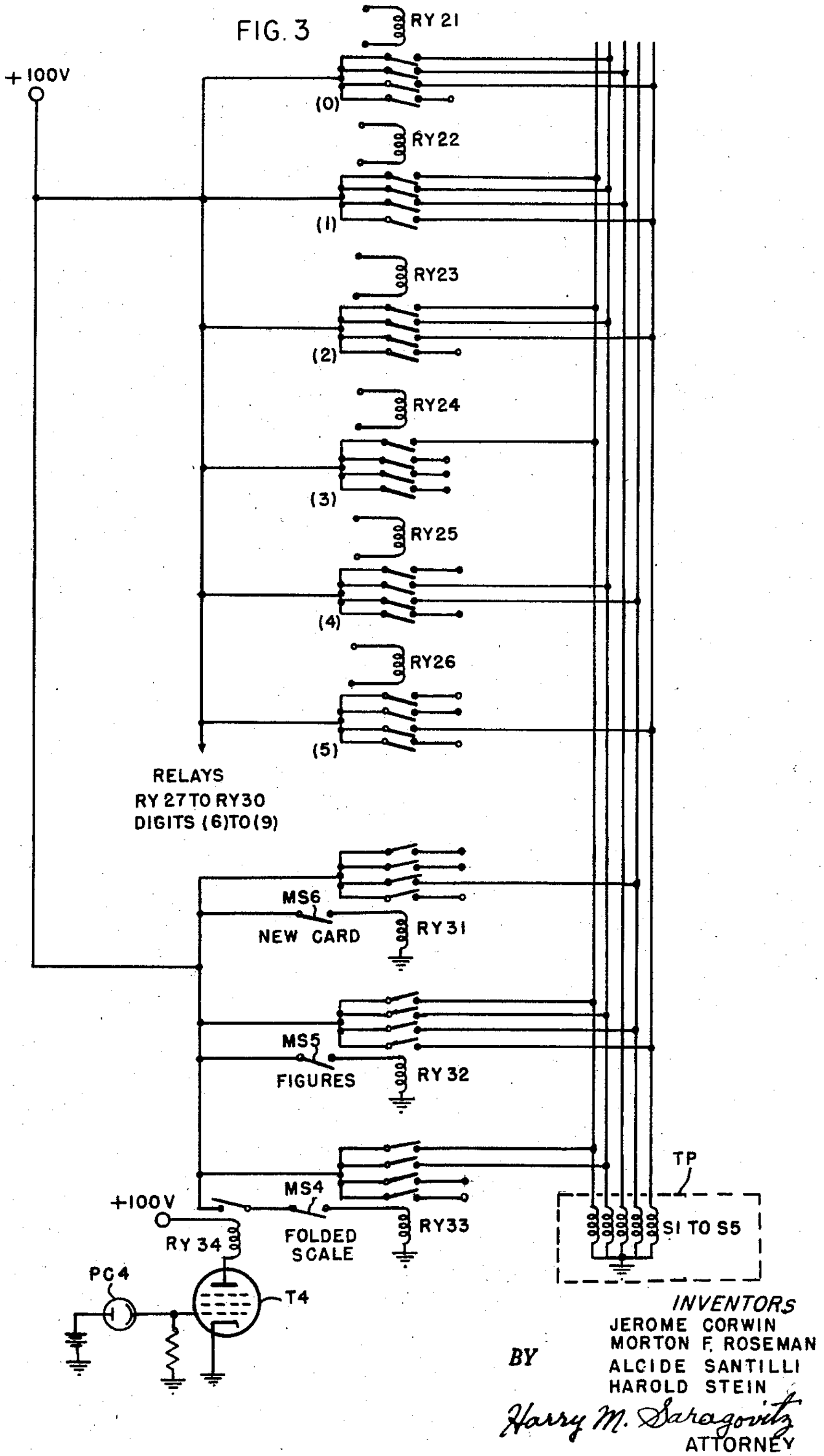

The various objects and features of the invention will be better understood from the following detailed description thereof when it is read in conjunction with the accompanying drawings in which Fig. 1 shows a combination pictorial representation, partially broken away to show details more clearly, and schematic circuit diagram of an automatic data conversion system or curve reader embodying the invention, a portion of which is in block diagrammatic form;

Figs. 2 and 3 respectively show schematically in greater detail different portions of the electrical circuit arrangement used in the system of Fig. 1; and Fig. 4 shows a view of the recording surface of a portion of a strip of coordinate record-chart paper of one type which might be used in the system of the invention, with an analog data curve recorded thereupon, and a folding scale along one margin of this paper indicating whether the ordinates of this data curve are positive or negative with respect to the time axis of the curve.

The data conversion system or automatic curve reader of the invention as shown in Fig. 1 comprises seven major apparatus units: namely, a chart holding and guiding mechanism CHG; a rotatable sensing or scanning head assembly SH; a constant speed motor M, which may be a synchronous 60-cycle A.C. motor; a gear drive assembly GD; a rotary sampling switch assembly RSS; a storage and read-out electrical circuit represented by the box designated SRC; and a commercial tape punching mechanism TP, commonly referred to as a reperforator, represented by the box so labeled.

The chart holding and guiding mechanism CHG as shown in Fig. 1 includes an outer framework 10 which may be rectangular in shape; a rotatable spool 20 on which the chart C containing on its upper surface the data curve to be converted to digital form, is wound in a roll, and a take-up spool 25 above the spool 20, mounted in brackets 30 at one end of the framework so that they extend transversely across that framework; a third rotatable spool 40 having end sprocket arrangements 45 with teeth 60, mounted at the other end of the framework with its axis parallel to that of spools 20 and 25; and a flat center guide plate 70 and a number of guide rollers 80 mounted at the top of the framework at spaced points between the two sets of spools. When the spool 40 is rotated by the associated gearing mechanism under control of the motor M in the manner to be described, the teeth 60 in the sprocket arrangements 45 engage with the edge perforations 90 in the chart C causing the chart C to be unwound from the spool 20, to pass under plate 70, over spool 40, and in a horizontal position in the direction indicated by the arrow over the top of guide plate 70 to the take-up spool 25, and to be wound up on the latter spool. The take-up spool 25 is externally spring loaded to insure the application of tension to the chart paper between the spools 40 and 25. This tension is required to prevent the paper, under the sensing head, from bulging thereby insuring a fixed distance between the chart paper and the lens-filter units on the sensing arms of that head, to be described later.

A thin sheet of paper or other suitable light-reflecting material, having a coordinate scale printed on one side, may be used for the chart C. As indicated in Fig. 4, this scale may include 50 ruled lines extending in parallel with each other lengthwise of the sheet, which are numbered from 0 to 100 across the sheet. The analog data curve AD may be recorded in ink on the ruled surface of the chart with its time axis extending lengthwise of the sheet along the line numbered 50 and its ordinates extending transversely on the sheet. The ink used for this curve may be of any suitable kind which, when dried, has substantially less light reflecting power than that of the remaining portion of the chart surface. Along one margin of this chart a folded (rectangular) scale FS is inscribed in similar ink, this scale at its crests indicating that the values of the opposite ordinates of the analog data curve AD are positive and at its troughs indicating that the values of the opposite ordinates of that curve are negative with respect to the time axis of the curve, for a purpose to be described later.

The rotatable sensing head assembly SH includes a drive shaft 110; a sensing head 130 having three radially disposed reading or sensing arms 140, 150, 160 which are 120 angular degrees apart, affixed to the top of the shaft 110 so as to be rotatable therewith; a slip ring assembly 170, a spur gear 180, a helical bevel gear 190 and two contact gears 200 and 210, mounted on or mechanically coupled to the shaft 110; and a wiper arm assembly 220 cooperating with the slip ring assembly 170 to connect the photoelectric cells of the sensing head assembly to the electrical storage and read-out circuit SRC in the manner to be described later in connection with Fig. 2. The sensing head 130 is adapted to be rotated continuously at a constant speed, say 10 revolutions per minute (r.p.m.), by the motor M through the gear train GD1 forming one branch of the gear drive assembly GD, and the spur gear 180 mounted on the shaft 110 of the sensing head assembly SH, which spur gear meshes with a gear in that train. The chart C in the chart holding and guiding mechanism CHG is driven intermittently, in synchronism with the rotation of the sensing head 130, through the rotating shaft 110 of sensing head assembly SH and connections between that shaft and the shaft of the spool 40 in the chart holding and guiding mechanism CHG, including the helical bevel gear 190 mounted on the shaft 110, a similar bevel gear 230 meshing therewith, the shaft 240 of the gear 230, the mechanically coupled contact gears 200 and 210, and a second gear train GD2 including a well-known Geneva driving mechanism 250 for providing intermittent stoppage of the movement of the chart, forming a second branch of the gear drive mechanism GD.

Each of the radially disposed reading arms 140, 150 and 160 of the sensing head 130 has a T-shaped hollow housing at its outer end containing an identical optical assembly. The optical assembly in each arm 140, 150, 160 includes an individual lens-filter unit LF1, LF2 or LF3 at the lower end of a vertically disposed branch of the housing; an individual photoelectric cell unit PC1, PC2 or PC3 at the upper end of this branch in line with the lens-filter unit; and a source of illumination L1, L2 or L3, which may comprise an electrical lamp unit, in the second branch of the housing forming the stem of the T at right angles to the first branch, for supplying through the interior of the housing and the lens-filter unit therein diffused light to illuminate the portion of the chart C over which the reading arm is being rotated. The output of each of the photoelectric cells PC1, PC2 and PC3 in the sensing arms 140, 150 and 160, respectively, connects through individual wire leads $l_1$, $l_2$ or $l_3$ to a different slip ring in the slip ring assembly 170 and is supplied through the associated individual wiper arm in the wiper arm assembly 220 to the electrical storage and read-out circuit SRC.

The automatic curve reader of the invention includes a fourth "stationary" reading arm 260, similar to each of the movable arms 140, 150 and 160 in the sensing head 130 in that it also includes at one end a T-shaped, hollow housing containing a similar optical assembly. As shown in Fig. 1, the optical assembly of the fourth arm 260 includes an individual lens-filter unit LF4 at the lower end of a vertically disposed branch of the housing, an individual photoelectric cell unit PC4 at the upper end of the vertical housing in line with the lens-filter unit, and a source of illumination L4 in the second housing branch at right angles to the vertical branch, for supplying diffused light through the interior of the housing and the lens-filter unit to illuminate a portion of the chart C. The fourth arm 260 is mounted on a bracket 270 attached to one side of the outer framework 10 of the chart holding and guiding mechanism CHG so that the lens-filter unit LF4 and thus the photoelectric cell unit PC4 is positioned at an optimum distance from and directly above the folding scale FS on the chart C and so that the axis of the vertical branch of the housing through the centers of LF4 and PC4 if extended to the chart C would touch a point on a straight line including the crests of the scale FS. The photoelectric cell PC4 is connected through leads $l_4$ in series with an electrical circuit controlling the operation of the tape punching mechanism TP, shown in Fig. 3, in a manner to be described later in connection with the description of operation of the complete system.

The function of the rotary sampling switch assembly RSS is to divide the information on the location of points on the analog data curve AD on chart C determined by the position of one of the rotating reading arms 140, 150 and 160 of the sensing head when the light from the associated light shource LF1, LF2 or LF3 crosses that curve, into "tens" and "units." The rotating switch assembly RSS includes the gear train GD1, which is the branch of the gear drive assembly GD driven by the motor M and which through spur gear 180 drives the shaft 110 of the sensing head 130 at a constant speed (10 r.p.m.); two output shafts 301 and 302 associated with different gears of gear train GD1; and two rotary selector stepping switches RS1 and RS2. The several gears of gear train GD1 are relatively proportioned and arranged so that when the motor M is operating, the output gear shaft 301 is rotated at ten times the speed of output gear shaft 302. The shafts 303 and 304 of the respective rotary switches RS1 and RS2 are coupled by the coupler units 305 and 306, respectively, to the output gear shafts 301 and 302, so that these switch shafts are also rotated at respective speeds in the ratio of ten to one. As indicated in Fig. 2 showing the details of the electrical circuit arrangements of the storage and read-out circuit SRC, the switch RS1 also includes an individual switch arm 307 mechanically affixed to the shaft 303 so as to be rotated at a corresponding speed, and an individual bank 308 of switching contacts of a number dependent on the number of "tens" units in the ordinate scale on the chart C, for example 20, as shown, cooperating with that switch arm, which contacts are effective in the "Tens" branch of that circuit; and the switch RS2 includes a switch arm 309 mechanically affixed to its shaft so as to be rotated at a corresponding speed, and an individual bank 310 having the same number of switching contacts as bank 308, cooperating with the switch arm 309 and which are effective in the "Units" branch of the circuit SRC.

Also, as shown in Fig. 1, the automatic curve reader of the invention includes a plurality of cams, CM1 to CM9, inclusive, which are mounted at different points on the shaft 110 of the sensing head 130 or on the shaft 240 coupled to shaft 110 through bevel gears 190 and 230, so as to be rotatable with these shafts. Each of the cams CM1 to CM9 is designed so that three times during each rotation cycle of the associated shaft and at a predetermined time during either a "reading" or "non-reading" period, it will cause the closing of the contacts of the associated one of the microswitches MS1 to MS9, respectively, to control the operation of a portion of the storage and read-out circuit SRC, as shown in Figs. 2 and 3, for a purpose to be described later in connection with the description of the complete system.

Figs. 2 and 3 in combination show the detailed electrical circuits of the invention, cooperating with the mechanical arrangements shown in Fig. 1 and described previously. Referring to Fig. 2, the photoelectric cell units PC1, PC2 and PC3 of the optical arrangements carried by the movable reading arms 140, 150 and 160, respectively, of sensing head 130, are respectively connected through an individual slip ring of slip ring assembly 170, the associated wiper arm of the wiper arm assembly 210 and the microswitch MS7, MS8 or MS9 (associated with cams CM7, CM8 and CM9, respectively, mounted on shaft 240 coupled to the sensing head shaft 110 as shown in Fig. 1) across the input circuit of amplifier A1, A2 or A3, respectively, in the input of the storage and read-out circuit SR6 shown to the right of the dashed line A—A in Fig. 2. The output circuits of the amplifiers A1, A2 and A3 are connected in parallel through a coupling circuit consisting of the series capacitor C1 and the shunt resistor R1 to the grid-cathode circuit of the thyratron discharge tube T1. The anode of the thyratron tube T1 is connected through the contacts 311 of the "Reset" microswitch MS3 (associated with the cam CM3 mounted on the shaft 110) to a +200 volt potential point on the circuit power supply (not shown) so that when these contacts are closed the anode of that tube is positively biased with respect to the cathode. The cathode of thyratron tube T1 is connected to ground through the resistor R2.

The circuit SRC has two branches respectively designated in Fig. 2 as the "Tens" branch and the "Units" branch, having their inputs connected in parallel to the thyratron tube T1 through its cathode resistor R2. The "Tens" branch includes in its input the contact bank 308 of the rotary switch RS1; a switching and storage vacuum tube T2; and a set of ten single-pole switching relays designated RY1 to RY10, inclusive. The "Units" branch includes the contact bank 310 of the rotary switch RS2; another storage and switching vacuum tube T3, similar to T2, and a second set of 10 single-pole switching relays designated RY11 to RY20, inclusive.

Although other types of switching and storage tubes operating to provide similar results may be used, the particular tube selected for preferable use for T2 and T3 in the system of the invention illustrated in Fig. 2 is a special commercial tube known as a "Burroughs" magnetron beam switching tube, operating as an electron beam distributor, which is a high vacuum tube employing beam-forming properties of crossed electric and magnetic fields. This tube is manufactured by Haydu Brothers of New Jersey (Plainfield, New Jersey) and is designated in their catalog as Type 6700. As described in this catalog, to perform the desired functions, each individual position of the tube consists of three basic electrodes of proper impedance characteristics, comprising: (1) a spade *s* which automatically forms and locks the electron beam; (2) a target anode or plate *a* with an efficient high current pentode-like output; and (3) a switching grid *g*, adaptable to all types of inputs, which will switch the beam at high speeds for high speed sequential switching without drawing appreciable current. As shown in Fig. 2, each of the tubes T2 and T3 has ten such positions, that is, ten spades *s*, ten target anodes *a*, and ten switching grids *g* of which five alternate ones represented in the drawing by black dots are even position grids and the five others are odd position grids, these electrodes being mounted radially about a single heater-type cathode *c* energized from any suitable power source, all of these electrodes being contained within a glass envelope *e*. These electrodes operate in the presence of an axial magnetic field produced by a small cylindrical magnet (not shown) permanently attached to the glass envelope *e*. Space current is supplied to each of the anodes *a* of tubes T2 and T3 by its connection through the normally-closed contacts 311 of the "Reset" microswitch MS3 to a +200-volt potential point on the common power supply for the circuit SRC, and the required operating voltages are supplied to the spades *s* of those tubes through suitably proportioned resistance and associated capacitors shown, as described in the manufacturer's catalog. The tubes T2 and T3 are designed so that only one anode *a* conducts at a time and so that the electron beam switches only one position each time an odd or even switching grid *g* is made negative with respect to the cathode *c* and the beam is in the even or odd position, respectively; that is, when the beam is in an even position and an odd grid is made negative with respect to the cathode, and when the beam is in an odd position and an even grid is made negative with respect to the cathode, the beam will switch one position. Also, the characteristics of the commercial tube used for T2 and T3 are such that the beam will not be switched when a switching grid is made more positive with respect to the cathode.

In the "Tens" branch of the circuit SRC, the alternate contacts, numbered 2, 4, 6, 8, 10, 12, 14, 16, 18 and 20, of contact bank 308 of rotary switch RS1 are all connected to a common lead 314 which is connected to ground through the cathode resistor R2 of the thyratron tube T1. Of the remaining contacts of the contact bank 308, the contacts numbered 1, 5, 9, 13 and 17 are connected to a second common lead 315 which is connected through the series resistor R4 to all the odd grids *g* of tube T2, and the contacts numbered 3, 7, 11, 15 and 19 are connected to a third common lead 316 which is connected through series resistor R3 to all the even grids *g* of tube T2. Similarly, in the "Units" branch of the circuit SRC, the alternate contacts numbered 2, 4, 6, 8, 10, 12, 14, 16, 18 and 20 of contact bank 310 of rotary switch RS2 are connected to a fourth common lead 317 which is connected through the cathode resistor R2 of the thyratron tube T1 to ground; and of the remaining contacts, those numbered 1, 5, 9, 13 and 17 are connected to a fifth common lead 318 which is connected through a series resistor R6 to all the odd grids of tube T3, and the contacts numbered 3, 7, 11, 15 and 19 are connected to a sixth common lead 319 which is connected through a series resistor R5 to all the even grids *g* of the tube T3.

As shown, the winding of a different one of the switching relays RY1 to RY10 is connected in series between each anode *a* of tube T2 and the common space current source for these anodes; and the winding of a different one of the switching relays RY11 to RY20 is connected in series between each anode *a* of tube T3 and the common space current source for the latter anodes. The "zero" spade *s* of tube T2 in the "Tens" branch of the circuit SRC is connected to ground through the normally-closed contacts 312 of the "Reset" microswitch MS3, and the "zero" spade *s* of tube T3 is connected to ground through the normally-closed contacts 313 of that microswitch. The contacts 312 and 313 of switch MS3 are ganged with the contacts 311 of that switch, and cam CM3 on shaft 110, associated with the switch MS3, is designed so that it will operate preferably just before the end of each reading cycle to open the contacts 311, 312 and 313 of that switch momentarily at such times to respectively disconnect the space current source from the anodes of the thyratron tube T1 and the tubes T2 and T3, and to cause the beams in the switching tubes T2 and T3 to be returned to the zero position, so as to condition the latter tubes for proper control by the signal pulse applied to the grid of the thyratron tube T1 during the next reading cycle.

The winding of a different one of ten four-pole "coding" relays RY21 to RY30 is connected between ground and a +100-volt potential point on the common power supply for circuit SRC through the normally-open contacts of a different one of the switching relays RY1 to RY10 in the "Tens" branch of SRC, and the contacts of the "Tens" microswitch MS1 (associated with the cam CM1 on the shaft 110 of the sensing head 130 as shown in Fig. 1) in series, so that when one of the relays RY1 to RY10 is operatively energized in response to the flow of current in the associated anode circuit of the tube T2 to close its contacts, and the contacts of microswitch MS1 are simultaneously closed, that coding relay will be operatively energized. Similarly, the winding of a different one of the coding relays RY21 to RY30 is connected between ground and a +100-volt potential point on the common power supply of circuit SRC through the normally-open contacts of a different one of the switching relays RY11 to RY20 in the "Units" branch of SRC, and the contacts of the "Units" microswitch MS2 (associated with the cam CM2 on the shaft 110 of sensing head 130 as shown in Fig. 1) in series, so that when one of the relays RY11 to RY20 is operatively energized in response to flow of current in the associated anode circuit of tube T3 to close its contacts, and the contacts of microswitch MS2 are simultaneously closed, that coding relay will be operatively energized.

As shown in the other portion of the storage and readout circuit SRC illustrated in Fig. 3 in which for the purpose of clarity the windings of the coding relays RY21 to RY30, also shown in Fig. 2, are repeated, each of these relays has four ganged sets of contacts which may be arranged in any desired code. In the particular 5-unit teletype code selected for specific illustration, the four sets of contacts of each of the relays RY21 to RY30 are respectively arranged so that when they are simultaneously closed in response to the energization of the associated relay winding they will cause operating current to be supplied from the associated 100-volt source to a respectively different one or combination of two or more of the five punching magnets or solenoids S1 to S5 in the tape punching mechanism TP, causing the operation of these solenoids to punch holes in the correspondingly located columns in different transverse rows on the tape T, which represent in digital code form the data causing operation of the coding relays under control of the "Tens" or "Units" branch of the circuit SRC. As indicated, the particular coded arrangement of the contacts of coding relay RY21 represent the digit 0, and the coded arrangement of each of the other coding relays RY22 to RY30 represent the digits 1 to 9, respectively.

Also, as shown in Fig. 3, the circuit SRC includes three other four-pole coding relays RY31, RY32 and RY33, each having four ganged sets of contacts which are respectively arranged in accordance with the same teletype code, i.e., the five-unit teletype code, so that when they are simultaneously closed by energization of the associated relay winding operating current will be supplied from the associated 100-volt source to a different one or combination of two or more of the five punching magnets or solenoids S1 to S5 of the tape punching mechanism TP. The winding of one of these relays, RY31, is connected across a 100-volt source through the contacts of the "New Card" microswitch MS6 associated with the cam CM6 on the shaft 110. The winding of a second one of these relays, RY32, is connected across a 100-volt source through the contacts of the "Figures" microswitch MS5 associated with the cam CM5 on the shaft 110. The winding of the third of these relays, RY33, is connected across the associated 100-volt source through the contacts of the "Folded Scale" microswitch MS4 associated with the cam CM4 mounted on the shaft 110, and the contacts of a fourth relay RY34, in series therewith. The winding of relay RY34 is connected through the electron discharge tube T4 and the leads $l_4$ to the output of the photoelectric cell unit PC4 in the stationary reading arm 260 of the automatic curve reader as shown in Fig. 1.

One cycle of operation of the automatic curve reader of the invention will now be described with reference to Figs. 1, 2 and 3.

In order to set the automatic curve reader of the invention into operation, the spool 20 on which a roll of the chart paper C on the upper surface of which the analog data curve AD to be translated into the binary digital form is transcribed in ink, is inserted transversely into the chart holding and guiding mechanism CHG as shown, with one end of that paper unwound from that roll and drawn under the guide plate 70 and through the guide rollers 80 to the spool 40 where the teeth 60 on the end sprocket arrangements 45 of that spool engage with its edge perforations 90; and the motor M is started into operation. The motor M in operation transmits the required power through gear train GD1 to the shaft 110 of the sensing head 130 causing its continuous rotation at a constant speed (10 r.p.m.) in the counterclockwise direction to rotate the angularly disposed reading arms 140, 150 and 160 of that head in turn along different curved paths transverse to the time axis of the chart C. The motor M through the rotating shaft 110, meshing bevel gears 190 and 230, shaft 240 of gear 230, mechanically-coupled contact gears 200 and 210, gear train GD2 including the Geneva driving mechanism 250 and the spool 40, moves the chart C intermittently along its time axis over the top of plate 70 in the direction indicated by the arrow at a rate of 0.15 inch per second to the take-up spool 25.

By proper synchronization of the rotary motion of the sensing head 130 and the intermittent motion of the chart C, the chart C is made to move only during the "non-reading" periods of the optics systems mounted on the reading arms 140, 150 and 160 of sensing head 130, that is, during the periods when all three reading arms are rotated to points off the chart C. When one of the three reading arms, say arm 140, is rotated to a point where its optical system is above the near edge of the chart C, a small circular patch of diffused light from the associated lamp L1, transmitted through the associated lens-filter unit LF1, proceeds to scan in a curved path transverse to the time axis of the curve. When this patch of light crosses an ordinate point on the curve AD, the difference in the reflected light intensity is transmitted back through the lens-filter unit LF1 of the same reading arm 140 and impinges on the photoelectric cell unit PC1 of that arm causing that cell to generate instantly an electric pulse. This pulse is transmitted to the storage and read-out circuit SRC of the system to control that circuit in a manner which will be described later in connection with Figs. 2 and 3. Each of the lamps L1, L2 and L3 carried on reading arms 140, 150 and 160, respectively, may be made by any suitable switching means (not shown) to light up when its associated arm reaches the near edge of the chart C and to be extinguished when that arm leaves the far edge of the chart.

When the first reading arm 140 completes its transverse sweep of 120 angular degrees across the chart C, spool 40 in the mechanism CHG is again rotated under control of the gear train GD2 driven from the shaft 110 of the sensing head 130 causing the chart C to be moved another 0.15 inch and then to stop so as to be ready for the next reading sweep by the second reading arm 150 over another curved path transverse to the analog data curve AD in another section of the chart C. At the end of the second reading sweep the chart C is moved another 0.15 inch and then stops, at which point the third reading arm 160 starts the third reading sweep across the data curve AD in the third section of the chart. After this third reading sweep, the cycle of operations described above is repeated with the reading arms 140, 150 and 160 in turn sweeping across the chart C along different curved paths during the intermittent periods in which that chart is maintained stationary.

*Reading period*

When one of the photoelectric cell units PC1, PC2 or PC3 associated with the reading arms 140, 150 and 160, respectively, crosses a point on the analog data curve AD, the signal pulse generated in that unit in response to the reflected light energy will be transmitted through the associated leads $l_1$, $l_2$, or $l_3$ to the storage and readout circuit SRC. For example, if that cell is PC1 mounted on arm 140, the signal pulse generated therein will be transmitted through leads $l_1$, one of the slip rings of slip ring assembly 170, the associated wiper arm of wiper arm assembly 220 and the contacts of the microswitch MS7, which are held closed at this time by the associated cam CM7 mounted on the rotating shaft 240, to the amplifier A1 in which this pulse will be amplified to a desired degree. The amplified pulse in the output of amplifier A1 will be applied through coupling circuit C1, R1 to the grid-cathode circuit of the thyratron tube T1 causing that tube to be fired so as to produce a voltage drop across the cathode resistor R2 of that tube.

Meanwhile, during the reading sweep of arm 140, the switch arms 307 and 309 of the rotary stepping switches RS1 and RS2 utilized for dividing the information on the location of ordinate points on the analog data curve AD provided by the pulses generated in the photoelectric cell units into "tens" and "units," are being continuously advanced under control of the rotating shaft 110 and the associated gear train GD1, one step at a time, over the numbered contacts in the associated contact banks 308 and 310 of these switches, respectively located in the inputs of the "Tens" and "Units" branches of the circuit SRC. The rotary switches RS1 and RS2, due to the connections of the contacts in their respective control banks 308 and 310 to the even and odd grids of the tubes T2 and T3 shown in Fig. 2 and described previously, will cause the electron beams in these tubes to be switched continuously from one position to another, each tube switching only one position each time a grid therein is made negative so that only one anode circuit conducts at a time.

Let it be assumed that the location of the point on the analog data curve AD on chart C which the photoelectric cell unit PC1 passes over during a reading sweep of the reading arm 140 is "65" on the ordinate scale of the chart. At the time the thyratron tube T1 fires, the switch arm 307 of the rotary switch RS will have reached the contact numbered 6 in that the contact bank 308 in the "Tens" branch circuit and the switch arm 309 of the rotary switch RS2 will have reached the contact numbered 5 on the contact bank 310 in the "Units" branch circuit. When the thyratron tube T1 is fired by the applied signal impulse, the voltage drop produced across the cathode resistor R2 through these contacts will be applied to the associated grids *g* of the tubes T2 and T3 in such manner as to make them more positive which, because of the inherent characteristics of the commercial tubes previously referred to, will stop the continuous switching actions in these tubes. Each switching tube T2 and T3 will be maintained in the operating condition effective at the time this happens, that is, with only the anode circuit of the tube T2 including the winding of the sixth switching relay, RY6, in the "Tens" branch, and the anode circuit of the tube T3 including the winding of the fifth switching relay, RY15, in the "Units" branch, conducting, so that these switching relays only will operate to close their respective contacts. The contacts of these relays will be maintained closed until the contacts 311, 312 and 313, respectively, of the "Reset" switch MS3 are opened momentarily under control of the associated cam CM3 just before the start of the next reading cycle, that is, when the rotating second reading arm 150 of the sensing head 130 approaches the near edge of the chart C and the first reading arm 140, therefore, has been rotated to a point away from the chart, to cause the tubes T1, T2 and T3 to be returned to the unoperated condition and the electron beams in the tubes T2 and T3 to be returned to the "zero" position. Until this happens, in effect, the two energy portions of the signal impulse initiated by photoelectric cell unit PC1 are stored in the operated switching relays RY6 and RY15 in the "Tens" and the "Units" branch, respectively.

*Reading-out period*

The cam CM1 on the shaft 110 of the sensing head 130, associated with the "Tens" microswitch MS1 is designed so that it will close for a short interval the contacts of that switch three times during each rotation of the shaft 110, each closure occurring just after one of the three arms 140, 150 and 160 of the sensing head has completed a reading sweep across the chart C and its photoelectric cell unit has passed the far edge of the chart. The cam CM2 on shaft 110 of sensing head 130 is designed so that it will close for a short interval the contacts of the associated "Units" microswitch MS2 three times during each rotation of the shaft 110, each closure occurring at a time slightly after the contacts of the "Tens" microswitch MS1 previously closed under control of the cam CM1, have released. The closure of the contacts of the "Tens" microswitch MS1 will complete an operating circuit from the associated 100-volt source through these contacts and the closed contacts of the still operated switching relay RY6 in the "Tens" branch in series, for the coding relay RY27 causing the operation of that relay to close simultaneously its four contacts connected as shown in a teletype code arrangement representing the digit 6. The closure of the contacts of the relay RY27 will complete operating circuits from the associated 100-volt power source to a particular combination of certain of the five punching solenoids S1 to S5 in the type punching mechanism TP causing their operation to punch a hole in one or more columns of one transverse row on the tape T, which in number and position represent in the teletype code the numeral 60 (digit 6×10).

The subsequent closure of the "Units" microswitch MS2 under control of the cam CM2 after the "Tens" microswitch MS1 has released to open the operating circuit for the coding relay RY27, will complete an operating circuit for the coding relay RY26 through the closed contacts of the still operated contacts of switching relay RY15 in the "Units" branch and the closed contacts of MS2, causing the operation of the relay RY26 to close its four contacts connected in a coded arrangement representing the digit "5". The closure of the contacts of relay RY26 will complete operating circuits from the associated 100-volt power source to a particular combination of certain of the five solenoids S1 to S5 in the tape punching mechanism TP which will result in holes being punched in one or more of the five columns or the next transverse row on the tape T, which will represent the digit "5". The holes punched in the two rows together indicate in digital code form the location of one ordinate point on the analog data curve AD on chart C.

Information on the location of other ordinal points in different sections of the analog data curve AD on chart C may be similarly translated during subsequent reading cycles to digital code form on the tape T.

*Other operations*

During each reading cycle of the automatic curve reader of the invention, the following other operations take place.

When the position of the chart C in the chart holding and guiding mechanism CHG is such that the light from the lamp L4 emerging from the lens-filter unit LF4 in the stationary reading arm 260 strikes a point on the crest of the folding scale FS on the margin of the chart, indicating that the values of the opposite ordinates of the analog data curve AD are positive with respect to the time axis of the curve, the light image of this point will be reflected back through the lens-filter unit LF4 to the photoelectric cell unit PC4 on that arm and will change the impedance of the latter unit in accordance with the amount of reflected light energy. This will cause the amount of series impedance in the electrical circuit including that unit, the auxiliary direct current source B, the space path of the vacuum tube T4 and the winding of relay RY34 in series, to be so reduced that the normally unenergized relay RY34 will be operatively energized by the current flow in that circuit so as to close its contacts. When the contacts of the "Folding Scale" microswitch MS4 are simultaneously closed under control of cam CM4 on shaft 110, an operating circuit from the associated 100-volt power source for the coding relay RY33 will be completed through the closed contacts of relay RY34 and switch MS4, and relay RY33 will operate to close through its four coded contacts operating circuits for certain ones of the solenoids S1 to S5 in the tape punching mechanism TP. This will cause holes to be punched in corresponding columns of a separate transverse row in the tape T, which by their number and relative position represent in code the information on the positive nature of the opposite ordinates in the analog data curve AD. The cam CM4 on shaft 110 is designed so that in each reading cycle it will close the contacts of the associated "Folding Scale" microswitch MS4 before the contacts of the "Units" and "Tens" microswitches MS2 and MS1 are closed, so that the key information on the polarity of the ordinate of the analog data curve AD is punched in a transverse row on the tape T before the information on the values of these ordinates is punched in other transverse rows on the tape.

Conversely, when the position of the chart C in CHG is such that the light emerging from the lens-filter unit LF4 of the stationary reading arm 260 strikes a trough in the folding scale FS on the chart margin, indicating that the values of the opposite ordinates in the curve AD are negative with respect to the time axis of the chart, the reflected light energy reaching photoelectric cell unit PC4 will not cause any change in the impedance of that unit, and the series impedance in the associated electrical circuit will not be reduced. The relay RY34, therefore, will remain unoperated, and the contacts of coding relay RY33 will remain open, so that no coded information on the negative polarity of the opposite ordinates on curve AD will be punched on the tape T.

The cams CM5 and CM6 on the shaft 110 are designed so that in each reading cycle they will close the contacts of the associated "Figure" microswitch MS5 and of the associated "New Card" microswitch MS6, respectively, at different respective times from that of the closure of the contacts of the "Folding Scale" microswitch MS4, and prior to the closure of the contacts of the "Tens" microswitch MS1 and the "Units" microswitch MS2, in the cycle. The closure of the contacts of the microswitch MS6 will complete an operating circuit for the coding relay RY31. The resultant operation of this relay, through its four operated coded contacts, will select (energize) a particular combination of certain of the five solenoids S1 to S5 in the tape punch mechanism TP causing its operation to punch a hole in one or more columns of a separate transverse row in the tape T, the punched holes by their number and position providing key information in code which will indicate to the punch card machine later used to analyze the data on the tape that a new card should be inserted in that machine.

The closure of the contacts of the "Figures" microswitch MS5 will complete an operating circuit for the coding relay RY32 which will operate to select (energize) a particular combination of certain of the solenoids S1 to S5 in the tape punching mechanism TP causing its operation to punch a hole in one or more columns of a separate transverse row on the tape T, which holes by their number and position will provide in code key information which will indicate to the punch card machine later used to analyze the data on the tape that for that cycle it should print numbers rather than characters on the cards.

Various modifications of the arrangements illustrated and described which are within the spirit and scope of the invention will occur to persons skilled in the art.

What is claimed is:

1. A system for automatically converting analog data in curvilinear form recorded in ink on one light reflecting surface of a chart having an ordinate scale thereon, to digital code form: said system including means for intermittently moving said chart longitudinally; a rotary device for scanning different sections of said chart surface in successive transverse sweeps with a spot of light during the respective time intervals in which said chart is stationary; at least one photoelectric cell mounted on said device and rotated thereby above said chart surface; one of the photoelectric cells during each scanning sweep being responsive to the change in the reflected light energy applied thereto when the scanning spot of light crosses a point on the data curve, to generate an electric impulse; proportional switching means controlled by said rotary means in accordance with the position of the impulse generating photoelectric cell when it generates an electric pulse, for establishing a pair of numerical channels for respectively transmitting different energy portions of the generated impulse, the established channels in combination by their assigned numbers defining the position of the impulse generating photoelectric cell, and thus the location of said curve point on the ordinate scale of said chart; a switching relay in each of said pair of numerical channels operatively responsive to the pulse energy therein; a tape; a tape punching mechanism fed with said tape and having a plurality of tape punching magnets; and coded relay means operating in response to the operated condition of the switching relays in the pair of established numerical channels to selectively energize particular coded combinations of said punching magnets causing their operation to punch perforations in separate transverse rows on said tape, the number and position of said perforations in each row representing in code the number of a different one of said pair of channels.

2. A system for automatically converting analog data in curvilinear form recorded in ink on one light reflecting surface of a chart having an ordinate scale thereon with consecutively numbered main divisions and subdivisions of each main division, to digital code form: said system including means for intermittently moving said chart longitudinally; a rotary device for scanning different sections of said chart surface in successive transverse sweeps of a spot of light thereacross during the respective intermittent time intervals in which said chart is stationary; a plurality of photoelectric cells mounted on said device so as to be rotated in turn above said chart surface with only one of them in position during each scanning sweep to receive reflected light from that surface and adapted to generate an electric impulse in response to a change in the amount of reflected light energy applied thereto when the scanning spot of light encounters the optical discontinuity of a point on the data curve; proportional switching means operating under control of said device in accordance with the position of the impulse generating photoelectric cell when it generates an impulse during a scanning sweep to establish a pair of numerical transmission channels for transmitting different energy portions of the generated impulse, which numerical channels by their assigned numbers define the location of the cell when generating the impulse and thus of said point on the data curve in terms of numbered main divisions and subdivisions of a main division, respectively, on said ordinate scale; a switching relay in each of said numerical channels operatively responsive to the impulse energy therein; a tape; a tape punching mechanism fed with said tape and having a plurality of punching magnets; and coded relay means operating in response to an operated condition of the switching relays in any two established numerical channels to set up coded combinations of the punching magnets in said mechanism causing its operation to punch perforations in separate rows on said tape, the number and position of which perforations in each row representing in code form the number of a different one of the established numerical channels.

3. A system for automatically converting analog data in curve form recorded in ink one one light reflecting surface of a chart having an ordinate scale with consecutively numbered main divisions and subdivisions of a main division on that surface, to digital code form: said system including two groups of numerical transmission channels in which the channels in one group have assigned numbers corresponding to different ones of the consecutively numbered main divisions and the channels of the second group have assigned numbers corresponding to different ones of the consecutively numbered subdivisions of a main division on the ordinate scale; means for intermittently moving said chart in the direction of the logitudinal axis of the data curve thereon; a constant speed rotary device for scanning different sections of said chart surface in successive transverse sweeps thereover with a spot of light during the respective intermittent time intervals in which said chart is stationary; a plurality of photoelectric cells mounted on said rotary device so as to be rotated thereby in turn in a curved path above said chart surface with only one of the cells receiving reflected light from that surface during each scanning sweep and being responsive to the change in the amount of reflected light energy applied thereto when the scanning spot of light crosses an ordinate point on said curve to generate an electric impulse; proportional switching means controlled by said device in accordance with the position of the impulse-generating electric cell when it generates an impulse for selectively conditioning the proper numerical channel in said one and said other group which together by their assigned numbers define the position of that cell at the time, and thus of said ordinate point on said curve for transmitting the generated impulse; a switching relay in each of said numerical channels operatively responsive to the impulse energy therein; a tape; a tape punching mechanism fed with said tape and having a plurality of punching magnets therein; and a plurality of coded relays respectively associated with different pairs of numerical channels including one in each of said groups having the same assigned number, each of said coded relays operating momentarily in response to an operated condition of the switching relay in an associated numerical channel to set up a particular coded combination of certain of said punching magnets in said mechanism operating that mechanism to punch perforations in a separate transverse row on said tape, the number and position of which perforations represent in code the assigned number of that associated channel.

4. The system of claim 1, in which means are provided for delaying the operation of said coded relay means in response to the operated condition of the switching relays in said pair of established numerical channels until the end of the scanning sweep in which the operations of these switching relays were initiated.

5. The system of claim 3, in which means are provided for insuring that each of said coded relays will be first operated in response to the operated condition of the switching relay in an associated numerical channel in one of said groups, and is then reoperated after its release, in response to the operated condition of the switching relay in an associated numerical channel in the other of said groups.

6. The system of claim 3, in which said rotary scanning device includes a rotatable shaft and a sensing head consisting of a plurality of radially disposed sensing arms each carrying one of said photoelectric cells, affixed to the top of said shaft so as to be rotatable therewith; a motor with associated gearing is provided for intermittently moving said chart in the direction of said longitudinal axis at a given speed, and for continuously rotating through said shaft said sensing arms at a predetermined constant speed synchronized with the intermittent motion of said chart so that the chart is stationary in each sensing cycle when one of said photoelectric cells is rotated in a curved path transverse to said axis over one of the sections of the chart surface, and advances at said given speed along said longitudinal axis only between sensing cycles when all of said photoelectric cells are rotated to points away from said chart.

7. The system of claim 3, in which said rotary scanning device includes a drive shaft, and a sensing head consisting of a plurality of radially disposed sensing arms each carrying one of said cells, affixed to said shaft so as to be rotatable therewith; a common constant speed motor with associated gearing means is provided for producing the intermittent motion of said chart and the rotation of the sensing arms of said head in turn over said chart surface at a constant speed synchronized with the motion of said chart so that one only of said cells picks up the reflected light from said chart surface during each of said scanning sweeps; said two groups of numerical channels have a common input circuit; a plurality of suitably designed cams mounted so as to be rotated by the drive shaft of said device, and individual microswitches respectively actuated under control of a different one of said cams, are provided for connecting the outputs of said photoelectric cells in turn to said common input circuit to enable transmission thereto of the electric impulses generated in said cells; and said proportional switching means includes a pair of output shafts, a train of gears coupling the drive shaft of said device to said output shafts, the gears in said train being arranged and proportioned so that when said drive shaft is rotating one of said output shafts is driven at a constant speed ten times that of the other output shaft, two rotary stepping switches each including an individual switch shaft coupled to a different one of said output shafts so as to be rotated at a corresponding speed, an individual switch arm affixed to and rotating with each individual switch shaft and an individual bank of consecutively numbered switch contacts cooperating with that switch arm; the consecutively numbered contacts in the individual bank of the rotary switch the shaft of which is rotated at the higher speed being respectively connected in the correspondingly numbered numerical channels in said one group in such manner that when the associated switch arm is stepped to any one of these contacts the associated channel in that group is conditioned to transmit one energy portion of the electric pulse present at that time in said common input circuit and thus cause operation of the switching relay in that channel, and the consecutively numbered contacts of the individual bank of the rotary switch the shaft of which is rotated at the lower speed being respectively connected in the correspondingly numbered numerical channels in said other group in such manner that when the associated switch arm is stepped to any one of these contacts the associated channel in that group is conditioned to transmit another energy portion of the electric pulse present at that time in the common input circuit and thus cause operation of the switching relay in that channel.

8. The system of claim 3, in which said rotary scanning device includes a rotatable drive shaft, a plurality of radially disposed sensing arms each carrying one of said photoelectric cells, affixed to the top of said shaft so as to rotate therewith and a motor with associated gearing for producing the intermittent longitudinal movement of said chart and the rotation of said sensing arms through said shaft at a predetermined constant speed in synchronism with the chart movement, and means are provided for delaying the operation of said coded relays in response to the operated condition of switching relays in said numerical transmission channels until the end of the scanning sweep in which the operations of these relays were initiated, comprising suitably designed cams mounted on said drive shaft so as to rotate therewith, and microswitches in the operating circuits of said coded relays controlled by said cams for conditioning these relays for operation with the necessary delay.

9. The system of claim 3 in which said rotary scanning device includes a rotatable drive shaft, a plurality of sensing arms each carrying a different one of said cells, affixed to the top of said shaft so as to rotate therewith and a motor with associated gearing for producing the intermittent longitudinal movement of said chart and the rotation through said shaft at a predetermined speed synchronized with said chart movement or said sensing arms; a pair of cams mounted on said shaft so as to be rotated thereby; two microswitches respectively associated with a different one of said cams so as to be activated thereby, one of said microswitches being connected in common to the operating circuits of all of said coded relays through parallel-connected contacts of all the switching relays in said one group of numerical channels and the other of said microswitches being connected in common to the operating circuits of all said coded relays through the parallel-connected contacts of all the switching relays in said other group of numerical channels, the construction of each of said pair of cams being such that the associated microswitches will be activated thereby at the end of each scanning sweep to allow operation of one of said coded relays in response to the operated condition of a switching relay in one of the numerical channels in either one of said groups, but at respectively different times for each group of numerical channels.

10. The system of claim 1, in which other coded relays are respectively operatively responsive under control of said rotary scanning device at predetermined different times in each scanning sweep to set up other operating combinations of said punching magnets in said mechanism causing the punching of perforations in other transverse rows on said tape, the perforations in each of said other rows by their number and position representing in code key information required for later analyzation of the coded curve information produced on said tape during the same scanning sweep.

11. The system of claim 1, in which said rotary scanning device includes a rotatable drive shaft, a plurality of radially disposed sensing arms affixed to the top of said shaft so as to be rotatable therewith and means for producing the intermittent longitudinal movement of said chart and the rotation of said shaft and sensing arms at a predetermined constant speed synchronized with the intermittent movement of said chart; one or more cams each with an associated microswitch are associated with said shaft so as to be rotated thereby; and other coded relays are provided, which are respectively operatively controlled by said cams through the associated microswitches at predetermined different times in each scanning sweep to set up respectively different coded combinations of the punching magnets in said mechanism causing the punching of perforations in separate transverse rows on said tape, the perforations in each row by their number and position representing in code key information required for later mechanical analyzation of the coded curve data produced on said tape during the same scanning sweep.

12. The system of claim 3, in which a rectangular curve is inscribed in ink on a margin of said chart surface opposite the data curve thereupon, said rectangular curve at its crests indicating that the values of the ordinates in the opposite portions of said data curve are positive with respect to the longitudinal axis of said data curve and at its troughs indicating that the values of the ordinates in the opposite portions of said data curve are negative with respect to said longitudinal axis; a stationary sensing arm carrying an individual source of light and an individual photoelectric cell, is mounted above said chart surface in such manner that when the ordinates of the adjacent portions of the data curve are positive with respect to said axis the light from said source on said stationary sensing arm will impinge on a crest of said rectangular curve and will be reflected thereby to the photoelectric cell on said stationary arm causing the impedance of that cell to have one value, and when the ordinates of the adjacent portion of the data curve are negative with respect to said axis the light from said source on said stationary arm will impinge on a trough in said rectangular curve and the reflected light applied to the photoelectric cell on said stationary arm will have another value; another coded relay is provided, which when operated will set up a different combination of the punching magnets in said mechanism to cause the punching of perforations in a separate transverse row on said tape which represent information as to the positive nature of the coded data curve representation recorded on the tape during the same scanning sweep; and means under control of said scanning device is provided for producing at a predetermined time in each scanning sweep the operation of said other coded relay but only if the impedance of the photoelectric cell on said stationary arm is at that time at said one value.

13. The system of claim 3, in which the scanning spot of light in each scanning sweep is provided by an individual light source carried on one of said sensing arms.

(References on following page)

References Cited in the file of this patent

UNITED STATES PATENTS 1,809,070 Schapira ---------------- June 9, 1931
1,910,556 McFarlane -------------- May 23, 1933
2,597,866 Gridley ---------------- May 27, 1952
2,678,254 Schenck --------------- May 11, 1954
2,762,038 Lubin ------------------ Sept. 4, 1956

FOREIGN PATENTS 232,782 Switzerland ------------ Sept. 16, 1944